United States Patent

[11] 3,616,223

| [72] | Inventor | Milton Harvey Weiner |
| | | 301 Orchard St., Fayetteville, N.Y. 13066 |
| [21] | Appl. No. | 679,557 |
| [22] | Filed | Oct. 31, 1967 |
| [45] | Patented | Oct. 26, 1971 |

[54] PENICILLIN INTERMEDIATE
8 Claims, No Drawings

| [52] | U.S. Cl. | 195/36 P |
| [51] | Int. Cl. | C12d 9/06 |
| [50] | Field of Search | 195/36 P, 36 |

[56] References Cited
UNITED STATES PATENTS
3,014,845 12/1961 Rolinson et al. ............... 195/36
3,152,050 10/1964 Grant et al. ................... 195/36 X Primary Examiner—A. Louis Monacell
Assistant Examiner—Seymour Rand
Attorneys—Curtis W. Carlson, Richard H. Brink, Robert B. Simonton and Herbert W. Taylor, Jr.

ABSTRACT: A more efficient process for the preparation of 6-amino-penicillanic acid has been devised which employs a penicillin amidase enzyme in the presence of a hydrazide compound. For example, *Streptomyces lavendulae* is employed to hydrolyze enzymatically penicillin V, said hydrolysis being conducted in the presence of a hydrazide such as benzhydrazide to produce superior yields of 6-aminopenicillanic acid from concentrations of penicillin in the range of 2 to 15 percent.

PENICILLIN INTERMEDIATE

BACKGROUND OF THE INVENTION

1. Field of the Invention 6-ammopenicillanic acid is a valuable intermediate in the production of the semisynthetic penicillins.

2. Description of the Prior Art

There is much art in the patent literature relating to the enzymatic hydrolysis of penicillins to 6-aminopenicillanic acid. All of the described methods are restricted to the hydrolysis of low-penicillin concentrations. The process claimed herein overcomes this disadvantage by the heretofore unknown use of a hydrazide which allows good yields of 6-aminopencillanic acid to be produced.

SUMMARY OF THE INVENTION

A superior yield of an aqueous solution of -aminopenicillanic acid is produced by treating a solution of a natural penicillin with the whole or crushed cells of a penicillin amidase producing bacteria or fungi or the soluble penicillin amidase obtained therefrom in the presence of about 0.5 to 4.0 moles of a hydrazide per mole of penicillin substrate, at a pH of about 6.0 to 11.0 at a temperature in the range of about 20° C. to 60° C.

This invention relates to an improved process for the enzymatic cleavage of penicillins to 6-aminopenicillanic acid (6-APA). More specifically this invention relates to the superior enzymatic cleavage of pencillins with resultant higher yields of 6-APA) when the process is conducted using a high concentration of a penicillin in the presence of a hydrazide.

6-aminopenicillanic acid, whose structure is shown below,

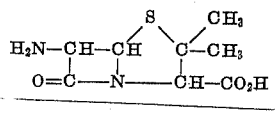

is an extremely valuable starting material in the production of the newer semisynthetic penicillins. The compound was first described by T. Kato (J. Antibiotics, Series A, 6, 130, 184 1953), and subsequently by S. Murao (J. Agric. Chem. Soc. Japan, 29, 400–07, June 1955). The latter author produced the compound by permitting penicillin amidase from *Penicillium chrysogenum* Q 176 to act upon the sodium salt of penicillin G. In this reaction phenylacetic acid was split off. The strain of *Penicillin chrysogenum* Q 176 was caused to secrete penicillin amidase by pretreatment with sulfathiazole. This procedure is difficult to carry out, however, and does not make it possible to obtain relatively large amounts of 6-aminopenicillanic acid.

A further synthesis for the production of 6aminopenicillanic acid is described in Belgian Pat. No. 569,728, whereby *Penicillium chrysogenum* is grown in the usual media under conventional conditions, except that the precursor, such as phenylacetic acid or phenoxyacetic acid is omitted. It is however, technically very difficult to separate and recover the desired product, such that the process is hardly suitable for commercial operations.

Until recently methods of producting 6-aminopenicillanic acid were difficult to execute, particularly in a commercially feasible manner in which the economical production of large quantities of the product is required. The synthetic production of 6-aminopenicillanic acid on a practical commercial scale has yet to be achieved.

Rolinson et al. (U.S. Pat. Nos. 3,014,845 and 3,014,846) report the use of various "penicillin amidases" obtained from various bacterial cultures to degrade enzymatically certain penicillins into 6-APA. A most preferred culture was a strain of *Streptomyces lavendulae*. The use of other enzymes for the purpose was reported by Lindner et al. (U.S. Pat. No. 3,127,366), Doyle et al. (U.S. Pat. No. 3,164,604) and Kaufman et al. (U.S. Pat. No. 3,260,653).

While great strides have been made in the process of producing 6APA by enzymatic hydrolysis via the so-called "-penicillin amidase," an enzyme or mixture of enzymes obtained from various bacterial cultures, the processes are still not as efficient as one would desire.

It is therefore an object of the present invention to provide an improved process for producing 6-aminopenicillanic acid. It is a particular object of the present invention to provide a superior process for producing 6-aminopenicillanic acid by the enzymatic degradation of certain penicillins.

It has now been found that certain penicillins can be more efficiently converted to 6aminopenicillanic acid by means of an enzyme or mixture of enzymes referred to herein as "-penicillin amidase," when the enzymatic hydrolysis is conducted in the presence of a hydrazide.

For example, if a 2 percent solution of penicillin V was treated with amidase obtained from *Streptomyces lavendulae*, a yield of about 30 to 40 percent of 6-APA was obtained. On the other hand, if a 10 percent solution of penicillin V was treated with the same amidase under similar conditions, a yield of only 5 percent 6-APA was obtainable.

It was therefore an object of the present invention to develop a process to shift the reaction to a more productive yield of 6-APA. The objects were achieved by the addition of a hydrazide compound which had the pronounced effect of increasing the production of 6-APA.

In the presence of a hydrazide such as benzhydrazide in the enzymatic cleavage reaction, the yield of 6-APA from treatment of a 2 percent penicillin V solution rose to 90 + % vs. 30 –40 percent without a hydrazide. Furthermore, it was possible to raise the yield of 6APA from a 10 percent penicillin V solution to about 60 percent in the presence of benzhydrazide vs. about 5 percent without benzyhydrazide.

Accordingly, there is provided by the present invention a process for the preparation of 6-aminopenicillanic acid and salts thereof which comprises treating a natural penicillin with a penicillin amidase in the presence of a hydrazide, said penicillin being selected from the group consisting of the penicillins having the formula

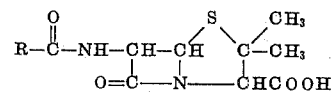

II wherein R is a member selected from the group consisting of alkyl groups having from 1 to 10 carbon atoms inclusive, and alkenyl groups having from 3 to 10 carbon atoms inclusive, or

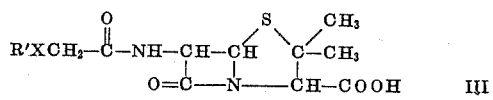

III wherein X is a member selected from the group consisting of sulfur and oxygen, R' is a member selected from the group consisting of alkyl groups having from 2 to 6 carbon atoms inclusive; alkenyl groups having from 3 to 6 carbon atoms inclusive; phenyl; and monosubstituted phenyl groups in which the substituent is a member selected from the group consisting of chloro, bromo, iodo, fluoro, nitro, alkyl groups having from 1 to 6 carbon atoms inclusive, alkenyl groups having from 3 to 6 carbon atoms inclusive, and alkoxy in which the alkyl group has from 1 to 6 carbon atoms inclusive. Such penicillins belong to the group herein called "natural" penicillins because there are produced, e.g. by fermentation of *Penicillium chrysogenum* in the presence of suitable precursors.

The term "alkyl" as used herein means both branched and straight chain saturated aliphatic hydrocarbon radicals having form 1 to 10 carbon atoms inclusive and includes such illustrative alkyl groups as methyl, ethyl, n-propyl, isopropyl, isobutyl, n-butyl, t-butyl, amyl, hexyl, decyl, etc. The term "alkenyl" means both straight and branched chain unsaturated aliphatic hydrocarbon radicals having from 2 to 10 carbon atoms, such as, for example, allyl, 2-methylallyl, $\Delta^8$ etc.

The penicillins of formula II above which are used as substrates in the process of the present invention include a mixture of the natural penicillins produced by a typical fermentation process in which no precursor is used. Such a natural mixture will include n-heptyl penicillin (penicillin K), 2-pentenyl penicillin (penicillin F), n-amyl penicillin (dihydro-penicillin F) and 3-penicillin (flavicin) as well as some benzylmethyl penicillin (penicillin G) and p-hydroxybenzylmethyl penicillin (penicillin X). Each of the penicillins of formula II can be used in the form of their salts with a cation which will not interfere with the enzymatic hydrolysis; the most common of such salts are the alkaline earth metal and alkali metal salts such as the sodium, calcium and potassium salts.

The penicillins of formula III above which are used as substrates in the process of the present invention include those penicillins produced by a fermentation process using a precursor as described in U.S. Pats. Nos. 2,562,410, 2,479,295, 2,479,296 and 2,854,450 relating to the preparation of many biosynthetic penicillins. Such penicillins includes, for example, phenoxymethyl penicillin (penicillin V) and monosubstituted phenoxymethyl penicillins such as p-methoxyphenoxy penicillin, p-nitrophenoxymethyl penicillin, hydroxyphenoxymethyl penicillin, p-chlorophenoxymethyl penicillin, p- and m-toloxyphenoxymethyl penicillin, etc.; alkoxymethyl penicillins such as, for example, ethoxymethyl penicillin, n-butoxymethyl penicillin, isoamyloxymethyl penicillin, hexyloxylmethyl penicillin; alkenyloxymethyl penicillins such as allyloxymethyl penicillin, 2-methylallyloxymethyl penicillin, etc.; and the sulfur-containing penicillins such as p-tolythiomethyl penicillin, $\beta$-naphthylthiomethyl penicillin, ethylthiomethyl penicillin, n-butylthiomethyl penicillin, allylthiomethyl penicillin, etc. Each of the penicillins of formula III can be used in the form of their salts with a cation which will not interfere with the enzymatic hydrolysis; the most common of such salts are the alkali metal and alkaline earth metal salts such as the sodium, calcium and potassium salts.

One penicillin amidase, i.e., one enzyme preparation which may be employed in the process of the present invention, is a known enzyme or mixture of enzymes, the preparation of which in the form of a solid and active aqueous solution is described by Kinichiro Sakaguchi and Sawago Murao in J. Agr. Chem. Soc. Japan, 23, page 411 (1950) [See also C.A. 45, 1197 (1951), and in greater detail by Sawago Murao in J. Agr. Chem. Soc. Japan, 29, pages 400–407 (1955), which is available in the English language from the Special Libraries Association, Translation Center, the John Crerar Library, Chicago, Ill. See also abstract in C.A., 51, 8160 g. (1957)]. In their preparation of penicillin amidase, both Sakaguchi and Murao used *Penicillin chrysogenum* Q176, a culture which has been widely used in the penicillin industry. [See the paper entitled "Separation and Identification of Penicillin Species in Commercial Penicillin (Q-176 Culture)" presented by C. J. Salivar et al. at the Conference on Antibiotic Research, Washington, D.C., Jan. 31 and Feb. 1, 1947, and U.S. Pats. No. 2,479,296 and No. 2,562,407.] A preferred culture, typed in U.S. Pat. No. 3,014,845 as a strain of *Streptomyces lavendulae*, and employed in the preparation of penicillin amidase in on deposit in the American Type Culture Collection at Washington, D.C., wherein it is identified as A.T.C.C. No. 13664. Another deposited culture, A.T.C.C. No. 13665, generally produces less pigment than A.T.C.C. No. 13664 and can also be employed to produce penicillin amidase.

A most preferred culture employed in this process is on deposit as A.T.C.C. No. 21138. The organism is a mutant of a parent strain identified as *Streptomyces lavendulae*.

Similarly improved yields of 6-APA are obtained when a hydrazide is used in combination with other penicillin amidases obtained from a variety of penicillin amidase producing micro-organisms such as the fungi *Botrytis cinerea* and *Penicillin chrysogenum* as well as certain other fungi of the genera Alternaria, Aspergillus, Epicoccum, Fusarium, Mucor, Penicillium, Phoma, and Trichoderma. The yeasts *Cryptococcus albidus* and a species of *Trichosporon, and several Actinomycetes* of the genus Streptomyces produce penicillin amidase. Yield improvements are also noted when one uses strains of *Bacterium proteus*, *Escherichia coli* A.T.C.C. 9637, *Escherichia coli* A.T.C.C. 11105 and *Aerobacter aerogenes* in the presence of a hydrazide.

Penicillin amidase can be produced from penicillin amidase-producing micro-organism of the genus Streptomyces by the following general procedure which is also illustrated by the specific procedure set forth in greater detail below.

A suitable enzyme preparation for the process of the present invention can be obtained by the following general procedure. First generation slopes on nutrient agar are first prepared from a soil stock of spores of a penicillin amidase-producing micro-organism of the genus Streptomyces. After inoculation permitting suitable growth and sporulation to take place, there first generation slopes form the inoculum for the second generation slopes of the same culture medium. Adequately sporulated second generation slopes are washed with sterile water and the resulting suspension of spores aseptically transferred to the seed vessel containing nutrient broth. When this fermentation has run for from 24 to 48 hours the brew is transferred to a larger patch of nutrient broth. After agitation and aeration for a period of 2 to 4 days the mycelium is removed to leave a clear fermentation liquor. Depending upon the particular organism used, the penicillin amidase will be found in either the fermentation liquor or in the whole cell mass. In the organism of choice of this invention, the desired penicillin amidase is found in the whole cell mass and it is used as such.

A preferred method of preparation of the *Streptomyces lavendulae* A.T.C.C. No. 21138 cells containing the penicillin amidase employed in the process of this invention is as follows:

PREPARATION OF PENICILLIN AMIDASE

A culture of Streptomyces A.T.C.C. No. 21138 is grown in shaken flasks, 10-liter and 90liter fermenters using a medium consisting of a broth diluted to a concentration of 20 g. per l. and pH 7.3 to 7.4. The broth is of the following composition:

| | Percent |
|---|---|
| Liquid glucose | 3.0 |
| Soya bean meal | 2.5 |
| Yeast extract (Difco) | 0.5 |
| Sodium chloride | 0.5 |
| Calcium carbonate | 0.2 | the first four ingredients being mixed together, the pH adjusted to 6.8 and the calcium carbonate then added. A seed stage is used by growing the micro-organism in the medium for 30 hours at about 27° C. with stirring and air flow as in a penicillin fermentation and using approximately 7 percent by volume of this growth to inoculate the final fermentation. This final fermentation is allowed to run for 96 hours at 26° to 28° C. with stirring and aeration, the mycelium is then removed by filtration (or by centrifugation, if desired.) The collected mycelia was washed and suspended in a volume of water equal to twice the volume of the original broth volume. The penicillin to be hydrolyzed is added to the mycelial suspension along with a quantity of a hydrazide. The hydrazide is usually used in a concentration proportionate to the concentration of the penicillin substrate, more particularly in a molar ratio of about 0.5 to 4.0 moles of hydrazide per mole of penicillin. The pH at which the enzymatic cleavage is conducted is usually maintained within the pH range of about 6.0 to about 11.0, but preferably in the range of about 6.5 to about 9. The temperature of the mixture is maintained in the range of about 20° C. to 60° C., but preferably in the range of 30° C. to 50° C., and most preferably at about 40° C.

The yields of 6-APA vary with the conditions used but are maximized within 2 to 24 hours, and usually within 2 to 6 hours.

An alternative fermentation media composed of:

| Ingredient: | Grams per liter |
|---|---|
| Soya bean meal | 40 |
| Cornmeal | 40 |
| $(NH_4)_2SO_4$ | 1 |
| $CaCO_3$ | 10 | is also useful in the production of the *Streptomyces* lavendulae cells and may be used in place of that set forth above in this procedure; this medium is preferably adjusted to pH 7.2 to 7.4 before autoclaving. See example 1 for another media of choice.

In the course of our experimentation, we have found many hydrazides that promote an increased yield of 6-APA in the above described process. They are:

1. Aromatic hydrazides having the formula

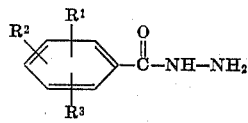

wherein $R^1$, $R^2$, and $R^3$ are alike or different and are hydrogen, (lower)alkyl (preferably $C_{1-C2}$), (lower)alkoxy, hydroxy, amino, N-(lower)alkylamino, or N,N-di(lower)alkylamino. Examples of these compounds are benzhydrazide, salicylhydrazide, 1-aminobenzhydrazide, 4methylbenzhydrazide, or the like, but preferably benzhydrazide.

2. Other hydrazides that have shown the ability to promote increased yields of 6-APA are carbohydrazide, phenylacetic hydrazide, naphthylacetic hydrazide, 3-indolecarboxylic acid hydrazide, 2thiophenecarboxylic acid hydrazide, succinic acid hydrazide, glycine hydrazide, tyrosine hydrazide, butyric acid hydrazide, t-butyl carbezate, cyclopentanecarboxylic acid hydrazide, and the like.

The aromatic hydrazides produce improvements of varying degrees in the yield of 6-APA. The aromatic hydrazide of choice because of efficiency and cost factors was benzhydrazide. Carbohydrazide greatly improved the 6-APA yield but tended to degrade the 6-APA formed by catalyzing a higher percentage destruction of the β-lactam ring than benzhydrazide. Other hydrazides were inactive, i.e. oxalyhydrazide, formylhydrazide, semicarbazide, acetylhydrazide and isonicotinic acid hydrazide.

Analysis of the mother liquors following the amidase hydrolysis of penicillin V (phenoxyacetamidopenicillanic acid) revealed the following components:
1. penicillin V.
2. 6-aminopenicillanic acid
3. phenoxyacetic acid
4. benzhydrazide
5. phenoxyacetyl benzhydrazide.

When the hydrazide used was benzhydrazide, the acylhydrazide compound recovered was:

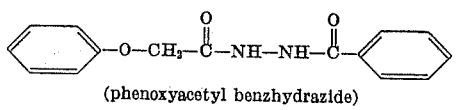

(phenoxyacetyl benzhydrazide)

The results indicate that when a hydrazide is used, dramatically higher yields of 6-APA are produced.

A series of kinetic studies were conducted to determine the optimal conditions under which to conduct the enzymatic hydrolysis in the presence of whole cells of *streptomyces lavendulae* A.T.C.C. 21138. The parameters studied were penicillin concentration, hydrazide and hydrazide concentration, temperature, pH and rate of hydrolysis.

Extensive experimentation was conducted using penicillin G(benzylpenicillin) and penicillin V as the enzyme substrates the substrate of choice is penicillin V.

Under the conditions employed prior to the discovery of the hydrazide, a 2 percent solution of a nontoxic salt of penicillin V (sodium, potassium, etc.) in the presence of *Streptomyces lavendulae* cells produced an average yield of 6-APA in the range of 30–40 percent within a time period of 4 to 12 hours.

It was subsequently discovered that the addition of 2 percent of benzhydrazide to the 2 percent penicillin V mixture would raise the yield of 6-APA to above 90 percent in about 2 to 3 hours.

A disadvantage of the enzymatic cleavage of penicillins in the past has been the restrictive penicillin concentration factor. When one is restricted to working with 2 percent to 3 percent solutions of a penicillin, it is necessary to use huge reaction vessels to obtain relatively small quantities of 6-APA. In the process as previously conducted, in the absence of a hydrazide, the yields of 6-APA obtained diminished proportionately to the increase in substrate concentration.

A 2 percent penicillin concentration without a hydrazide yields an average 30 to 40 percent 6-APA. A 5 percent penicillin concentration yields approximately a 15 to 20 percent 6-APA. A 10 percent penicillin V concentration yields about 5 percent 6-APA. However, in the presence of a hydrazide the effect of concentration, while not overcome, is somewhat controlled. For example, a 2 percent penicillin V concentration in the presence of 2 percent benzhydrazide yields 90 plus percent 6-APA. An 8 percent penicillin V concentration with benzhydrazide produced about 70–80 percent yield of 6-APA. A 10 percent penicillin concentration with benzhydrazide produced a 60–70 percent yield of 6-APA in about 4 to 6 hours.

Considering all the factors of the enzymatic cleavage system, i.e., rate of hydrolysis, enzyme employed, 6-APA yields and stability of the 6-APA produced, it was concluded that benzhydrazide was the most effective hydrazide in this process.

Studies using varying concentrations of benzhydrazide were conducted using 8 percent penicillin V, pH 7 and 40° C.

| % Benzhydrazide | Rate of 6-APA Produced | % 6-APA at equilibrium | material balance |
|---|---|---|---|
| 2% | 8.4 mg./hr. | 63% | 92% |
| 3% | 10.6 mg./hr. | 70% | 87% |
| 4% | 12.7 mg./hr. | 75% | 86% |

The study indicated the most preferred benzhydrazide concentration is obtained within a range of about 3 to 4 percent. Above this range one gets increasing β-lactam decomposition.

Similar studies using 8 percent penicillin V and 3 percent benzhydrazide at pH 7, 8 and 9 indicate the best yields of 6-APA are obtained in the range of about pH 7 to 8. At a pH above 8 the decomposition of the penicillin and 6-APA is sufficiently rapid as to cause unacceptable losses (greater than 20 percent β-lactam decomposition).

The optimal temperature range appeared to be about 30° C. to about 40° C. Most efficient temperature appears to be about 40° C. Temperatures above 40° C. tended to denature the enzyme and increase the rate of β-lactam destruction. However, the reaction does occur at temperatures in the range of about 10° C. to about 60° C.

Various other studies were conducted to determine the preferred overall conditions of the hydrolysis It was determined that concentrations in excess of 15 percent penicillin substrate did not substantially increase the yield of 6-APA. While the hydrolysis can be conducted at higher concentrations, the most preferred concentration range was about 7 to 10 percent.

Kinetically the best results with the maximum yield of quality 6-APA was obtained when the following proportions of ingredients and conditions were employed:
1. 70 to 100 g./l. penicillin V.
2. 30 g./l. benzhydrazide
3. An amount of *Streptomyces lavendulae* cells/l. which are equivalent to those obtained from 600 ml. of *lavendulae* culture whose preparation is previously described under the title "Preparation of Penicillin Amidase" or in example 1.
4. A ph about 7.5 to 8.5, preferably pH 8.
5. A temperature in the range of about 35 to 45° C.

The hydrolysis reaches equilibrium (maximum 6-APA) in about 2 to 24 hours, but usually in about 2 to 6 hours.

After the completion of the enzymatic hydrolysis, the unreacted penicillin and hydrazide, and the acyl-hydrazide compound formed are removed by extraction with an organic solvent, e.g., butyl acetate, methylisobutylketone, etc. after mother liquor acidification of pH 2-3.

Further purification may be affected by neutralizing the aqueous solution and precipitating impurities by adding a solvent such as acetone, methanol or ethanol and then centrifuging to remove the precipitated impurities. The clarified solution is adjusted to pH 6.5 to 7 and passed over an ion exchange resin to adsorb the product with or without prior concentration.

It is preferred to use a column of a highly basic anion exchange resin, in the chloride form, of a cross-linked polystyrene type with quarternary ammonium functional groups such as Dowex I and DeAcedite FF, both of which are commercially available. A cross-linked polystyrene cationic exchange resin with sulfonic acid functional groups such as Amberlite IR 120 can also be used. In the absorption step we prefer to use about 4 kg. of resin per 15 liters of solution containing from 40 to 60 gm. of 6-aminopenicillanic acid. Elution of the product from the resin is accomplished by the addition of hydrochloric acid, e.g., 0.05 N HCl. Procedures for the recovery of 6-aminopenicillanic acid from aqueous solutions are also illustrated by Belgian Pat. No. 569,728.

The objectives of the present invention have been achieved, by the provision according to the present invention, of the process for the preparation of an aqueous solution of 6-aminopenicillanic acid which comprises
incubating a solution of natural penicillin, preferably a penicillin having the formula

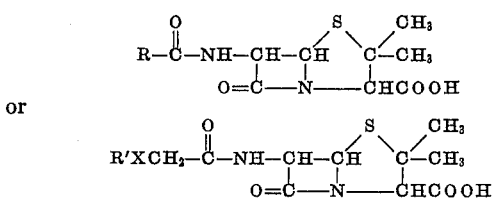

or wherein R is a member selected from the group consisting of alkyl groups having from one to 10 carbon atoms inclusive and alkenyl groups having from three to 10 carbon atoms inclusive, X is a member selected from the group consisting of sulfur and oxygen, R' is a member selected from the group consisting of alkyl groups having from two to six carbon atoms inclusive; alkenyl groups having from three to six carbon atoms inclusive; phenyl; and monosubstituted phenyl in which the substituent is a member selected from the group consisting of chloro, bromo, iodo, fluoro, nitro, alkyl groups having from one to six carbon atoms inclusive, alkenyl groups having from three to six carbon atoms inclusive, and alkoxy in which the alkyl group has from one to six carbon atoms inclusive, or the salts thereof, and most preferably penicillin V or penicillin G and the salts thereof, in a concentration of 2 percent to 15 percent but preferably 4 to 12 percent with the whole or crushed cells of a penicillin amidase producing bacteria or fungi or the soluble penicillin amidase obtained therefrom, but preferably actinomycete of the species *Streptomyces lavendulae*, and most preferably a strain known as *Streptomyces lavendulae* A.T.C.C. 21138, in the presence of at least about 0.5 moles of an active hydrazide per mole of penicillin substrate, but preferably 0.5 to 2.0 moles of a hydrazide per mole of penicillin, and most preferably 0.7 moles to 1.5 moles of hydrazide per mole of penicillin, said hydrazide being selected from those active hydrazides described herein, but preferably being an aromatic hydrazide, and most preferably being benzhydrazide, The reaction mixture being maintained at a pH in the range of about 6.0 to 11.0, but preferably in the range of about 6.5 to 9.0, and most preferably in the range of about 7.5 to 8.5, at a temperature in the range of about 10° C. to 60° C., but preferably in the range of about 20° C. to 50° C., and most preferably in the range of about 35° C. to 45° C., for a period of time of about 2 to 24 hours, but preferably 2 to 12 hours, and most preferably 2 to 6 hours.

DESCRIPTION OF THE PREFERRED EMBODIMENTS

The following examples are given to illustrate but not to limit the present invention.

EXAMPLE 1

Preparation of Streptomyces Lavendulae Cells for Amidase Hydrolysis.

A culture of *Streptomyces lavendulae* A.T.C.C. 21138 is inoculated into a vessel containing a seed culture media comprised of:
Sucrose—2.5%
Pharmamedia—1.5%
Corn Steep—1.0%
Ammonium Sulfate—0.3%
Calcium Carbonate—0.2%

The seed stage culture is allowed to grow for 24 to 48 hours after which the whole brew becomes the inoculum for the final *Streptomyces lavendulae* fermentation.

One liter of the seed culture above is inoculated into 9 to 10 liters of a broth comprised of:
Nutrisoy—3.0%
Pharmamedia—0.5%
Sodium chloride—0.5%
Calcium carbonate—0.3%
Cerelose—5.0%
Sucrose—2.0%

The fermentation is incubated for 4 to 6 days and the mycelia harvested by filtration or centrifuging. The mycelia are washed and used as such for the enzymatic hydrolysis of penicillin to 6-APA.

EXAMPLE 2

6-Aminopenicillanic Acid from 2 Percent Penicillin V (1 percent benzhydrazide)

A washed mass of mycelia obtained from 600 ml. of fermentation which was prepared as described in example 1 was suspended in one liter of distilled water. The pH was adjusted to about 7. Twenty grams of potassium penicillin V and 10 grams of benzhydrazide were added. The suspension was maintained at 35° C. and the pH monitored at about pH 7 by the addition of sodium hydroxide. Samples were withdrawn periodically and determined chromatographically. The maximum yield of 6-APA was obtained between 2 to 4 hours and was 90 plus percent of theory.

EXAMPLE 3

6-Aminopenicillanic Acid from 2 Percent Penicillin V (2 percent benzhydrazide)

A washed mass of mycelia obtained from 500 ml. of fermentation which was prepared as described in example 1 was suspended in 1 l. of distilled water. The pH was adjusted to pH 8. Twenty grams of potassium penicillin V, containing $C^{14}$ in the acyl moiety and 20 g. of benzhydrazide were added. The suspension was maintained at 35° C. Samples were withdrawn periodically nd analyzed chromatographically. The maximum yield was obtained at about 3 hours and was 90 plus percent of theory. The majority of the radioactivity was found in material identified as the phenoxyacetyl benzhydrazide and the remainder was in the phenoxyacetic acid.

EXAMPLE 4

6-Aminopenicillanic Acid from 8 Percent Penicillin V (3 percent benzhydrazide)

The washed mycelia obtained from 500 ml. of culture as described in example 1 was suspended in 1 liter of distilled water. The pH was adjusted to a range of 7.8 to 8.2. Eighty grams of potassium penicillin V and 30 grams of benzhydrazide were added. The suspension was maintained at 40° C. with stirring. Samples were withdrawn periodically and determined chromatographically and analytically. The maximum yield of 6-APA was obtained in about 4 to 6 hours and the yield was 75 percent.

In the absence of the benzhydrazide the yield of 6-APA was about 5 percent and this was not attained until sometime after 12 hours.

EXAMPLE 5

6-Aminopenicillanic Acid from Penicillin G (2 percent benzhydrazide)

The washed mycelia obtained from 500 ml. of culture as described in example 1 was suspended in 1 liter of distilled water. The pH was adjusted to 7. Twenty grams of penicillin G and 20 grams of benhydrazide were added. The yield of 6-APA obtained was about 32 percent and this was obtained in between 2 to 6 hours. The phenoxyacetyl benzhydrazide was isolated and identified.

The same experiment conducted in the absence of benzhydrazide, produced a 10 percent yield of 6-APA.

EXAMPLE 6

6-Aminopenicillanic Acid from Penicillin G using E. Coli and 1 percent Benzhydrazide.

Five hundred ml. of a dense suspension of *Escherichia coli* ATCC 11105 cells in a phosphate buffer solution of pH 7.5 was adjusted to a pH of 8.5 by means of a sodium carbonate solution. Upon the addition of 1 mg. percent of Lysozyme, 0.05 percent of sodium desoxycholate, 0.01 mole of sodium ethylene diamine tetraacetate and 0.4 percent of toluene, this suspension was held at 37° C. for 2 hours in order to bring about lysis of the bacterial cells. Thereupon, the pH of the preparation was brought back to pH 7.5 by HCl, and the residual cells not affected by lysis and other insoluble residues were separated by centrifugation. The supernatant, liquid extract was diluted to 1 liter with distilled water to which was added 20 grams of potassium penicillin V and 10 grams of benzhydrazide. The temperature was maintained at about 37° C. The maximum yield of 90 plus percent 6-APA was obtained in about 1 to 2 hours. The phenoxyacetyl benzhydrazide was isolated and identified.

The same reaction run in the absence of benzhydrazide produced a similar 90 plus percent yield. However, the maximum yield of 6-APA was not obtained until after 6 hours.

EXAMPLE 7

6-Aminopenicillanic Acid from Penicillin V using Streptomyces lavendulae soluble amidase and 1 percent benzhydrazide Using a culture of *Streptomyces lavendulae* A.T.C.C. 13664, a fermentation of this organism by the procedure described in example 1 was prepared. A 500 ml. portion of the whole broth was filtered to remove the mycelium. The clear filtrate, which has been previously determined to contain soluble penicillin amidase, was diluted to 1 liter. The pH was adjusted to about pH 8. Twenty grams of potassium penicillin V and 10 grams of benzhydrazide were added. The process produce 90 plus percent 6-APA in about 2 to 6 hours.

When the process was conducted in the absence of the benzhydrazide the yield of 6-APA was about 30 to 40 percent and the maximum yield was not obtained until after 10 hours.

EXAMPLE 8

6-Aminopenicillanic Acid from Penicillin V and 2 percent 4-methylbenzhydrazide.

Substitution in the procedure of example 4 for the 30 grams of benzhydrazide used therein of 20 grams of 4-methylbenzhydrazide produced a 51 percent yield of 6-aminopenicillanic acid.

Substitution in the same example for the 80 grams of penicillin V and 30 grams of benzhydrazide used therein of 120 grams of penicillin V and 20 grams of 4-methylbenzhydrazide respectively produced a 35 percent yield of 6-APA.

EXAMPLE 9

6-Aminopenicillanic Acid from Penicillin V and 2 percent Salicylhydrazide.

Substitution in the procedure of example 4 for the 80 grams of penicillin V and 30 grams of benzhydrazide used therein 120 grams of penicillin V and 2 percent salicylhydrazide respectively produced a 51 percent yield of 6-APA.

EXAMPLE 10

6-Aminopenicillanic Acid from Penicillin V and 2 percent Glycylhydrazide.

Substitution in the procedure of example 4 for the 30 grams of benzhydrazide used therein of 20 grams of glycylhydrazide produced an 80 percent yield of 6-APA.

EXAMPLE 11

6-Aminopenicillanic Acid from Penicillin V and 2 percent phenylacetylhydrazide.

Substitution in the procedure of example 4 for the 80 grams of penicillin V and 30 grams of benzhydrazide use therein of 120 grams of penicillin V and 20 grams of phenylacetylhydrazide produced a 39 percent yield of 6-APA.

EXAMPLE 12

6-Aminopenicillanic Acid from Penicillin V and 2 percent Thiophenecarboxylic Acid Hydrazide.

Substitution in the procedure of example 4 for the 30 grams of benzhydrazide used therein of 20 grams of thiophenecarboxylic acid hydrazide produced an 80 percent yield of 6-APA.

EXAMPLE 13

6-Aminopenicillanic Acid from Penicillin V and 2 percent Butyric Acid Hydrazide.

Substitution in the procedure of example 4 for the 30 grams of benzhydrazide used therein of 20 grams of butyric acid hydrazide produced a 48 percent yield of 6-APA.

EXAMPLE 14

6-Aminopenicillanic Acid from Penicillin V and 2 percent Butyl Carbezate.

Substitution in the procedure of example 4 for the 30 grams of benzhydrazide used therein of 20 grams of butyl carbezate produced a 47 percent yield of 6-APA.

EXAMPLE 15

6-Aminopenicillanic Acid from Penicillin V and Soluble Penicillin Amidase extracted from *Streptomyces lavendulae*.

The washed mycelia from 2 liters of culture prepared as described in example 1 were suspended in a media of the following composition:
Urea       360 grams.
Sodium desoxycholate    7 grams
Distilled water    1000 ml.

The pH was adjusted to 8.5 with 0.05 M tris-hydroxymethylaminomethane buffer—HCl.

The mixture was shaken for 12 hours at room temperature and then extracted by dialysis against circulating distilled water for a period of 48 hours to remove the urea and other undesired materials. The contents remaining in the dialysis bag were filtered to remove any precipitates. The clear filtrate thus produced contains the soluble amidase.

Penicillin V (1.6 grams) and benzhydrazide (600 mg.) were added to 20 ml. of this filtrate and the pH was adjusted to and maintained at pH 8 at 40° C.

After 4 hours it was found 61 percent of the penicillin V had been converted to 6-APA.

In the absence of benzhydrazide, the conversion was only 9 percent 6-APA.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

I claim:
1. A process for the preparation of an aqueous solution of 6-aminopenicillanic acid which comprises
    incubating an aqueous solution of a natural penicillin
        with the whole or crushed cells of a penicillin amidase producing bacteria or fungi or the soluble penicillin amidase obtained therefrom,
        in the presence of at least about 0.5 moles of an active hydrazide per mole of penicillin substrate
        at a pH of about 6.0 to 11.0 and
        at a temperature in the range of about 20° C. to 60° C.
2. A process of claim 1 for the preparation of an aqueous solution of 6-aminopenicillanic acid which comprises
    incubating an aqueous solution of a natural penicillin
        with the whole or crushed cells of a penicillin amidase producing strain of *Streptomyces lavendulae* or the soluble amidase obtained therefrom,
        in the presence of about 0.5 to 2.0 moles of an active hydrazide per mole of penicillin substrate,
        said hydrazide being selected from the group comprising
        A. A compound having the formula

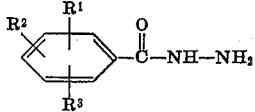

wherein $R^1$, $R^2$, and $R^3$ are alike or different and are hydrogen, (lower)alkyl, (lower)alkoxy, hydroxy, amino, N-(lower)alkylamino or N,N-di(lower)alkylamino, or
    B. Carbohydrazide, phenylacetic hydrazide, naphthylacetic hydrazide, 3-indolecarboxylic acid hydrazide, thiophenecarboxylic acid hydrazide, succinic acid hydrazide, glycine hydrazide, tyrosine hydrazide, butyric acid hydrazide, t-butylcarbezate and cyclopentanecarboxylic acid hydrazide,
    at a pH of about 6.0 to 10.0 and
    at a temperature in the range of about 25° C. to 50° C. for a period of about 2 to 24 hours.
3. A process of claim 1 for the preparation of an aqueous solution of 6-aminopenicillanic acid which comprises
    incubating an aqueous solution of a penicillin substrate having the formula

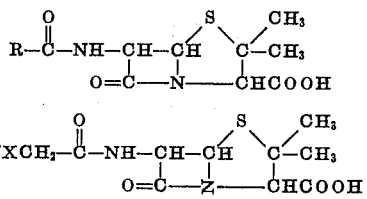

wherein R is a member selected from the group consisting of alkyl groups having from 1 to 10 carbon atoms inclusive and alkenyl groups having from 3 to 10 carbon atoms inclusive,
    X is a member selected from the group consisting of sulfur and oxygen, R' is a member selected from the group consisting of alkyl groups having from 2 to 6 carbon atoms inclusive; alkenyl groups having from 3 to 6 carbon atoms inclusive; phenyl; and monosubstituted phenyl in which the substituent is a member selected from the group consisting of chloro, bromo, iodo, fluoro, nitro, alkyl groups having from 1 to 6 carbon atoms inclusive, alkenyl groups having from 3 to 6 carbon atoms inclusive, and alkoxy in which the alkyl group has from 1 to 6 carbon atoms inclusive,
    with whole cells of *Streptomyces lavendulae* A.T.C.C. No. 21138,
    in the presence of about 0.7 to 1.5 moles of an active hydrazide,
    said hydrazide being selected from the group comprising
    A. Compounds having the formula

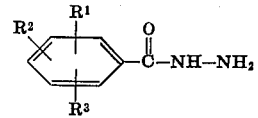

wherein $R^1$, $R^2$ and $R^3$ are alike or different and are hydrogen, (lower)alkyl, (lower)alkoxy, hydroxy, amino, N-(lower)-alkylamino,
    or N,N-di(lower)alkylamino, or
    B. carbohydrazide, phenylacetic hydrazide, naphthylacetic hydrazide, 3-indolecarboxylic acid hydrazide, thiophenecarboxylic acid hydrazide, succinic acid hydrazide, glycine hydrazide, tyrosine hydrazide, butyric acid hydrazide, t-butylcarbezate and cyclopentanecarboxylic acid hydrazide,
    at a pH of about 6.0 to 9.0, and
    at a temperature in the range of about 25° C. to 50° C. for a period of about 2 to 24 hours.
4. A process of claim 1 for the preparation of an aqueous solution of 6-aminopenicillanic acid which comprises
    incubating about a 2 to 15 percent aqueous solution of penicillin V or penicillin G,
    with whole cells of *Streptomyces lavendulae* A.T.C.C. No. 21138
    in the presence of about 0.7 to 1.5 moles of an aromatic benzhydrazide or carbohydrazide per mole of penicillin substrate, said aromatic hydrazide having the formula

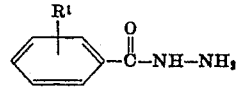

wherein $R^1$ is hydrogen, (lower)alkyl, (lower)alkoxy, hydroxy, amino, N-(lower)alkylamino or N,N-di(lower)alkylamino, at a pH of about 6.0 to 9.0 and
at a temperature in the range of about 25° C. to 50° C.
for a period of about 2 to 12 hours.

5. A process of claim 1 for the preparation of an aqueous solution of 6-aminopenicillanic acid which comprises
incubating about 4 to 12 percent aqueous solution of penicillin V
with whole cells of *Streptomyces lavendulae* A.T.C.C. No. 21138
in the presence of about 0.7 to 1.5 moles of benzhydrazide per mole of penicillin V
at a pH of about 7.0 to 9.0,
at a temperature in the range of 35° C. to 45° C.
for a period of 2 to 12 hours.

6. A process of claim 1 for the preparation of an aqueous solution of 6-aminopenicillanic acid which comprises incubating an aqueous solution of a penicillin substrate having the formula

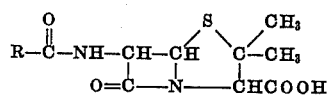

or

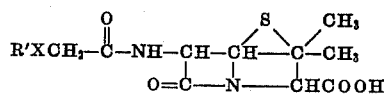

wherein R is a member selected from the group consisting of alkyl groups having from 1 to 10 carbon atoms inclusive and alkenyl groups having from 3 to 10 carbon atoms inclusive,
X is a member selected from the group consisting of sulfur and oxygen, R' is a member selected from the group consisting of alkyl groups having from 2 to 6 carbon atoms inclusive; alkenyl groups having from 3 to 6 carbon atoms inclusive; phenyl; and monosubstituted phenyl in which the substituent is a member selected from the group consisting of chloro, bromo, iodo, fluoro, nitro, alkyl groups having from 1 to 6 carbon atoms inclusive, alkenyl groups having from 3 to 6 carbon atoms inclusive, and alkoxy in which the alkyl group has from 1 to 6 carbon atoms inclusive,
with whole cells of *Streptomyces lavendulae*, in the presence of about 0.7 to 1.5 moles of an active hydrazide,
said hydrazide being selected from the group comprising
A. compounds having the formula

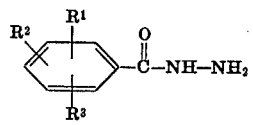

wherein $R^1$, $R^2$ and $R^3$ are alike or different and are hydrogen, (lower)alkyl, (lower)alkoxy, hydroxy, amino, N-(lower)alkylamino, or N,N-di(lower)alkylamino, or
B. carbohydrazide, phenylacetic hydrazide, naphthylacetic hydrazide, 3-indolecarboxylic acid hydrazide, thiophenecarboxylic acid hydrazide, succinic acid hydrazide, glycine hydrazide, tyrosine hydrazide, butyric acid hydrazide, t-butylcarbezate and cyclopentanecarboxylic acid hydrazide,
at a pH of about 6.0 to 9.0, and at a temperature in the range of about 25° C. to 50° C.
for a period of about 2 to 24 hours.

7. A process of claim 1 for the preparation of an aqueous solution of 6-aminopenicillanic acid which comprises
incubating about a 2 to 15 percent aqueous solution of penicillin V or penicillin G,
with whole cells of *Streptomyces lavendulae*,
in the presence of about 0.7 to 1.5 moles of an aromatic benzhydrazide or carbohydrazide per mole of penicillin substrate, said aromatic hydrazide having the formula

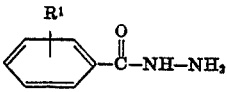

wherein $R^1$ is hydrogen, (lower)alkyl, (lower)alkoxy, hydroxy, amino, N-(lower)alkylamino or N,N-di(lower)alkylamino,
at a pH of about 6.0 to 9.0 and
at a temperature in the range of about 25° C. to 50° C.
for a period of about 2 to 12 hours.

8. A process of claim 1 for the preparation of an aqueous solution of 6-aminopenicillanic acid which comprises
incubating about a 4 to 12 percent aqueous solution of penicillin V
with whole cells of *Streptomyces lavendulae*,
in the presence of about 0.7 to 1.5 moles of benzhydrazide per mole of penicillin V
at a pH of about 7.0 to 9.0,
at a temperature in the range of 35° C. to 45° C.
for a period of 2 to 12 hours.

* * * * *